UNITED STATES PATENT OFFICE.

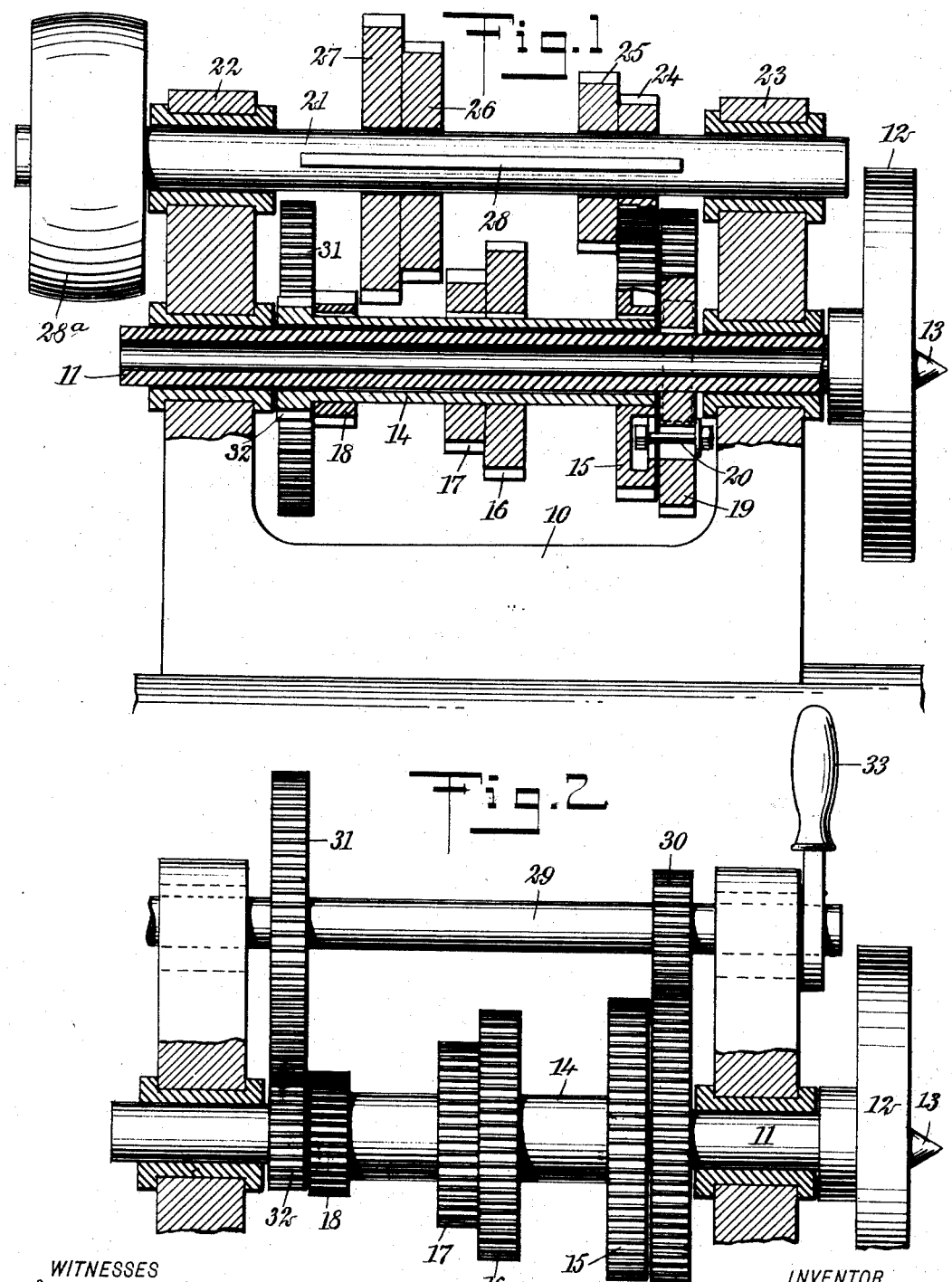

GEORGE FREDERIC FISHER, OF TORREON, MEXICO.

LATHE-HEAD.

No. 927,960.  Specification of Letters Patent.  Patented July 13, 1909.

Application filed August 10, 1908. Serial No. 447,764.

*To all whom it may concern:*

Be it known that I, GEORGE FREDERIC FISHER, a citizen of the United States, and a resident of Torreon, Coahuila, Mexico, have invented a new and useful Lathe-Head, of which the following is a full, clear, and exact description.

This invention relates to certain improvements in lathes, and more particularly to the means employed for driving the chuck or face plate at any one of a plurality of different speeds.

The object of the invention is to provide means whereby the ordinary belt-driven lathe having a cone pulley may be converted into an all-gear lathe.

Reference is to be had to the accompanying drawings, forming a part of this specification, in which similar characters of reference indicate corresponding parts in both the figures, and in which—

Figure 1 is a vertical longitudinal section through a lathe head constructed in accordance with my invention; and Fig. 2 is a top plan view thereof, portions being shown in section.

In the construction illustrated in the accompanying drawings, I employ the ordinary lathe head 10, having a spindle 11, which latter is provided with the mechanism for supporting the material operated upon and rotating the same. As shown, the spindle 11 carries a face plate 12 and a center 13, although an ordinary chuck might be employed in place thereof. Upon this spindle, I mount a loose sleeve 14 in place of the step pulley commonly employed, and to this sleeve I key a plurality of gears 15, 16, 17 and 18, of varying sizes and spaced apart along the length thereof. The spindle carries the ordinary gear 19, and the gear 15 is so constructed that it may be rigidly locked to the gear 19. Any suitable mechanism may be employed for accomplishing this object, as, for instance, a bolt 20, having the head thereof extending into an annular groove in the gear 15, and having the body thereof extending through a radial slot in the gear 19.

Adjacent the spindle 11 and parallel thereto, I provide a shaft 21, preferably mounted in two pedestal bearings 22 and 23, the lower portions of which are employed in place of the ordinary caps for holding the spindle 11 within its bearings. The shaft 21 carries four gears 24, 25, 26 and 27, slidable upon a feather 28, and of such size as to correspond with the four gears 15, 16, 17 and 18 of the sleeve 14. Any one of the gears on the shaft 21 may be moved to bring it into mesh with the corresponding gear on the sleeve 14, to rotate the latter. The shaft 21 carries a drum or pulley $28^a$, over which rides the main drive belt, not shown. The customary back gears may be employed for driving the spindle 11 at a different speed. As shown, there is employed a back shaft 29, having a gear 30 thereon adapted to intermesh with the gear 19, and also having a gear 31 adapted to intermesh with a gear 32 formed integral with the sleeve 14, or rigidly secured thereto. The shaft 29 is preferably mounted in eccentric sleeves at its ends, and there is provided a handle 33 for throwing said shaft laterally to take the gears 30 and 31 out of mesh with the gears 19 and 32.

In the operation of my improved attachment, power is continuously applied to the drum or pulley $28^a$, to rotate the shaft 21; and motion is transmitted from this shaft to the sleeve 14 through any one of the sets of gears 27 and 18, 26 and 17, 25 and 16, or 24 and 15. The gear 15 is locked to the gear 19, and as the latter is keyed to the spindle 11, the material secured in place in the lathe will be rotated. When it is desired to rotate the spindle 11 at a lower speed, the handle 33 is thrown to bring the gears 30 and 31 into mesh and the locking bolt 20 is loosened. Motion is then transmitted from the shaft 21 to the sleeve 14 through any one of the pairs of gears, and the sleeve rotates the shaft 29 through the gears 32 and 31, while the shaft rotates the spindle 11 through the gears 31 and 19.

Having thus described my invention, I claim as new and desire to secure by Letters Patent:

A lathe head having a spindle, a sleeve encircling the same but unattached thereto, a drive shaft parallel to said spindle, a plurality of pairs of gears carried by said sleeve and said drive shaft, one gear of each pair being longitudinally movable to bring it into or out of mesh with the other gear of its pair, a back drive shaft, intermeshing gears adapted to connect said back drive shaft and said spindle, and means for locking the gear of said last-mentioned intermeshing gears which is secured to said spindle to one of the gears of one of said pairs which is secured to said sleeve.

In testimony whereof I have signed my name to this specification in the presence of two subscribing witnesses.

GEORGE FREDERIC FISHER.

Witnesses:
AUBURN BAILEY,
EDWIN STULL SYLVESTER.